(12) United States Patent
Nätti (10) Patent No.: US 9,761,396 B2
(45) Date of Patent: Sep. 12, 2017

(54) MAGNET AND ACTUATOR (71) Applicant: Ixtur Oy, Piikkio (FI)

(72) Inventor: Reijo Nätti, Littoinen (FI)

(73) Assignee: Ixtur OY, Piikkio (FI)

( * ) Notice: Subject to any disclaimer, the term of this patent is extended or adjusted under 35 U.S.C. 154(b) by 0 days.

(21) Appl. No.: 15/115,701

(22) PCT Filed: Jan. 30, 2015

(86) PCT No.: PCT/FI2015/050064
§ 371 (c)(1),
(2) Date: Aug. 1, 2016

(87) PCT Pub. No.: WO2015/114221
PCT Pub. Date: Aug. 6, 2015

(65) Prior Publication Data
US 2017/0011876 A1    Jan. 12, 2017

(30) Foreign Application Priority Data

Jan. 30, 2014  (FI) ..................................... 20145100
Jan. 12, 2015  (WO) .................. PCT/FI2015/050014
Jan. 14, 2015  (WO) .................. PCT/FI2015/050019

(51) Int. Cl.
*B66C 1/04* (2006.01)
*H01F 7/02* (2006.01)
(Continued)

(52) U.S. Cl.
CPC ........... *H01H 36/0006* (2013.01); *G01D 5/12* (2013.01); *H01F 7/0205* (2013.01);
(Continued)

(58) Field of Classification Search
CPC ..... H01F 7/0252; H01F 7/0257; H01F 7/0268
(Continued)

(56) References Cited

U.S. PATENT DOCUMENTS 2,915,682 A    12/1959  Bower
2,947,921 A    8/1960   Watelet
(Continued)

FOREIGN PATENT DOCUMENTS

DE    3029720 C1    8/1982
DE    19951703 A    5/2001
(Continued)

OTHER PUBLICATIONS

Finnish Patent and Registration Office Search report of priority application No. 20145100, dated Sep. 29, 2014.
(Continued)

*Primary Examiner* — Ramon M Barrera
(74) *Attorney, Agent, or Firm* — Berggren Inc.

(57) ABSTRACT

The present invention provides a magnet, which comprises a body having a first and a second section, and a slide arranged to be movable relative to the body between a first and a second position. The slide comprises a permanent magnet, and a first and a second pole piece that are attached to opposite magnetic pole surfaces of the permanent magnet. The first section comprises a hole that opens into a first cavity of the body, the bottom of the first cavity being delimited at least partly by the second section. The slide is movably arranged in the hole so that the second pole piece is directed towards the bottom of the first cavity, wherein at the first position of the slide, magnetic flux generated by the permanent magnet is short-circuited by the first section, and at the second position of the slide, magnetic flux generated by the permanent magnet is directed through the first and the second section.

16 Claims, 3 Drawing Sheets

(51) Int. Cl.
*G01D 5/14* (2006.01)
*B25B 11/00* (2006.01)
*H01H 36/00* (2006.01)
*H01F 7/04* (2006.01)
*H01F 7/16* (2006.01)
*G01D 5/12* (2006.01)

(52) U.S. Cl.
CPC ......... *H01F 7/0226* (2013.01); *H01F 7/0252* (2013.01); *H01F 7/0257* (2013.01); *H01F 7/0268* (2013.01); *H01F 7/04* (2013.01); *H01F 7/1615* (2013.01); *H01F 2007/1669* (2013.01)

(58) Field of Classification Search
USPC ...... 335/229–234, 285–295; 269/8; 294/65.5
See application file for complete search history.

(56) References Cited

U.S. PATENT DOCUMENTS

| | | | |
|---|---|---|---|
| 3,079,191 A | 2/1963 | Engelsted et al. | |
| 3,109,967 A | 11/1963 | Churchill | |
| 3,179,858 A | 4/1965 | Binder et al. | |
| 3,503,024 A | 3/1970 | Iwasaki | |
| 4,121,865 A | 10/1978 | Littwin, Sr. | |
| 4,306,207 A | 12/1981 | Tada et al. | |
| 4,494,098 A * | 1/1985 | Haneda | H01F 7/1615 335/230 |
| 6,512,435 B2 * | 1/2003 | van Namen | E05B 47/00 335/229 |
| 2011/0248804 A1 * | 10/2011 | Wygnanski | H01F 7/1646 335/230 |
| 2012/0153649 A1 | 6/2012 | Thiel | |

FOREIGN PATENT DOCUMENTS

| | | |
|---|---|---|
| EP | 1541255 A1 | 6/2005 |
| EP | 2085349 A1 | 8/2009 |
| GB | 874600 A | 8/1961 |
| JP | 2009039849 A | 2/2009 |
| JP | 2009135411 A | 6/2009 |
| WO | 2012160262 A1 | 11/2012 |

OTHER PUBLICATIONS

Finnish Patent and Registration Office Search report of priority application No. 20145101, dated Sep. 29, 2014.
Finnish Patent and Registration Office Search report of priority application No. 20145103, dated Sep. 30, 2014.
European Patent Office Search report of international application No. PCT/FI2015/050019, dated Mar. 26, 2015.
European Patent Office Search report of international application No. PCT/FI2015/050064, dated Jun. 1, 2015.
European Patent Office Search report of international application No. PCT/FI2015/050014, dated Mar. 23, 2015.

* cited by examiner

MAGNET AND ACTUATOR

PRIORITY

This application is a U.S. national application of the international application number PCT/FI2015/050064 filed on Jan. 30 2015, and claiming priority of Finnish national application FI20145100 filed on Jan. 30 2014, PCT application PCT/FI2015/050014 filed on Jan. 12 2015, and of PCT/FI2015/050019 filed on Jan. 14 2015, the contents of all of which are incorporated herein by reference.

TECHNICAL FIELD OF THE INVENTION

The present invention relates to a magnet according to the preamble of the appended independent claim.

BACKGROUND OF THE INVENTION

Magnets are used in many fields of technology to perform various operations, such as to control motion, to switch electrical circuits and to move objects. A magnet is typically provided with a certain functionality to change its magnetic state. A magnet may comprise, for example, a coil which produces a magnetic field that is dependent on the amount and the direction of the electric current supplied to the coil. The coil may be used alone, or it can be combined with a permanent magnet, whereby the coil is used to increase or decrease the magnetic field produced by the permanent magnet. Alternatively, a magnet may comprise a movable part, the position of which determines the magnetic state of the magnet. The movable part, which comprises a permanent magnet, is moved relative to a body of the magnet, for example, with a magnetic force produced by a coil that is arranged to encircle the movable part.

An example of a magnet that comprises a movable part for changing the magnetic state of the magnet is disclosed in the document WO 2012/160262. The magnet of the document WO 2012/160262 is a so-called bi-stable magnet, wherein the movable part, which comprises a permanent magnet, is arranged to be movable relative to a body of the magnet between two positions. In the first position, the movable part is in contact with the body, whereby the magnetic flux generated by the permanent magnet may be directed through the body to an object to be attached. In the second position, the movable part is separated from the body so that the flow of the magnetic flux in the body is significantly reduced and thus the holding force of the magnet is almost negligible. The body of the magnet comprises a coil that is arranged around the movable part. The movable part is moved between the two positions by supplying a sufficient amount of electric current through the coil in a suitable direction.

A problem associated with the magnet of the document WO 2012/160262 relates to the second position of the movable part, i.e. to the position, wherein the movable part is not in contact with the body. In order to make sure that the movable part stays in its second position, either electric current must constantly be supplied to the coil, or the magnet must be provided with springs or other suitable means to push the movable part towards the second position. In the first case, a disadvantage is the power consumption of the coil, whereas in the second case, a disadvantage is the complicated structure, which may easily be damaged, thus resulting in a malfunction of the magnet.

OBJECTIVES OF THE INVENTION

It is the main objective of the present invention to reduce or even eliminate prior art problems presented above.

It is an objective of the present invention to provide a magnet having two stable magnetic states at which the magnet does not consume electrical energy. It is also an objective of the invention to provide a magnet, whose magnetic state can be changed easily using very little electrical energy.

It is a further objective of the invention to provide a magnet having a structure that enables to achieve a large holding force with a small size. It is still a further objective of the invention to provide a magnet that has a simple structure, low manufacturing costs, a long life expectancy and a great reliability.

In order to realise the above-mentioned objectives, the magnet according to the invention is characterised by what is presented in the characterising part of the appended independent claim. Advantageous embodiments of the invention are described in the dependent claims.

DESCRIPTION OF THE INVENTION

A typical magnet according to the invention comprises a body having a first and a second section, and a slide arranged to be movable relative to the body between a first and a second position, the slide comprising a permanent magnet, and a first and a second pole piece attached to opposite magnetic pole surfaces of the permanent magnet. In a typical magnet according to the invention the first section comprises a hole that opens into a first cavity of the body, the bottom of the first cavity being delimited at least partly by the second section, in which hole the slide is movably arranged so that the second pole piece is directed towards the bottom of the first cavity, wherein at the first position of the slide, magnetic flux generated by the permanent magnet is short-circuited by the first section, and at the second position of the slide, magnetic flux generated by the permanent magnet is directed through the first and the second section.

The magnet according to the invention is a bi-stable magnet, whose magnetic state can be changed by moving the slide between two stable positions, i.e. between the first and the second position. The first and the second position are positions, wherein the slide remains until it is acted upon by a force that moves the slide to the other position.

At the first position of the slide, magnetic flux generated by the permanent magnet is short-circuited by the first section. This means that the magnetic flux flows from one pole piece to the other mainly through a portion of the first section surrounding the hole. At the first position, the permanent magnet, at least part of the first pole piece and at least part of the second pole piece are located inside the hole. The first position of the slide is a position of equilibrium to which the magnetic force of the permanent magnet actively guides the slide when the permanent magnet is inside the hole. If the slide is moved from the first position in either direction, the permanent magnet produces a counterforce that works against the moving force and tries to pull the slide back to the first position. At the first position of the slide, the magnetic flux is mainly directed from one pole piece to the first section, and from the first section to the other pole piece in a direction which is essentially perpendicular to a wall of the hole.

At the second position of the slide, magnetic flux generated by the permanent magnet is directed through the first and the second section. If the first and the second section are connected to each other directly or through a connecting member that is made of ferromagnetic material, magnetic flux can flow between the first and the second section. If the first and the second section are separated in such a manner that they are not in contact with each other, an object made of ferromagnetic material is needed to efficiently close the magnetic circuit between the first and the second section. Such an object is, for example, an object to be lifted. The magnetic flux flows through the object, as a result of which the object is attached to the magnet. At the second position, the second pole piece is located outside the hole, and at least part of the first pole piece is located inside the hole. Preferably, also the permanent magnet is located outside the hole. At the second position, the magnetic flux is mainly directed between the first pole piece and the first section in a direction essentially perpendicular to the wall of the hole, and between the second pole piece and the bottom of the first cavity in a direction essentially perpendicular to the bottom wall. The direction of the magnetic flux to/from the second pole piece is thus turned by about 90 degrees between the first and the second position of the slide. At the second position of the slide, the distance between the second pole piece and the second section is preferably less than 5 mm, less than 1 mm, or less than 0.1 mm. Preferably, at the second position of the slide, the second pole piece is in contact with the bottom of the first cavity, and even more preferably, at the second position of the slide, the second pole piece is in contact with the portion of the first section that defines at least part of the bottom of the first cavity.

Depending on the application, the body can be constructed in such a manner that the first and the second section are directly connected together, or are connected and separated by one or more members and/or sections. If the first and the second section are separated, the magnet can be used as a magnet for attaching to an object, whereby the object that is simultaneously in contact with the first and the second section closes the magnetic circuit, when the slide is at its second position. If the first and the second section are in direct contact, so that the magnetic flux may flow directly from one section to the other, the magnet can be used as a solenoid actuator. Preferably, the first and the second section are arranged immobile with respect to each other.

The first and the second section can be formed of one or more parts. The first and the second section of the body are made of magnetic material that is suitable for conducting magnetic flux. Magnetic material of the first and the second section is ferromagnetic material, such as iron, nickel, cobalt or their alloys.

The slide is movably arranged in the hole of the first section, meaning that at least part of the slide is always inside the hole. The slide is movable in the longitudinal direction of the hole. The slide is arranged to be movable linearly between the first and the second position. The slide is moved in a first direction, when it is moved towards the first position and in a second direction, when it is moved towards the second position. The slide can be designed to be moved between the first and the second position manually, for example with a handle attached to the slide, or with the help of suitable driving means.

The slide has a sandwich structure, wherein the permanent magnet is arranged between the first and the second pole piece. The first and the second pole piece are attached to different poles of the permanent magnet and are made of magnetic material, so that the magnetic flux generated by the permanent magnet may be conducted through them. Magnetic material of the first and the second pole piece is ferromagnetic material, preferably iron. The permanent magnet can be, for example, a neodymium magnet, an alnico magnet or a samarium-cobalt magnet.

The first and the second pole piece can be, for example, disc-shaped and have the same diameter. The permanent magnet can be, for example, disc-shaped and have the same diameter as or smaller diameter than the first and the second pole piece.

According to an embodiment of the invention the thickness of the permanent magnet is smaller than the thickness of the first pole piece and the thickness of the second pole piece. The use of thicker pole pieces prevents the magnetic flux from saturating.

The permanent magnet may consist of one or more magnet pieces arranged in one or more layers. The permanent magnet can, for example, be formed of sector pieces arranged in one layer in such a manner that the same poles of the sector pieces are disposed on the same side of the permanent magnet. The number of sector pieces can be, for example, 2, 3, 4-6 or 7-10. The permanent magnet can alternatively be formed of magnet pieces arranged one on the other. The magnet pieces can be arranged one on the other in such a manner that ferromagnetic discs are arranged between the magnet pieces and the different poles of the magnet pieces are arranged to face each other.

Preferably, the slide is cylindrical and is arranged to be movable in the hole that is also cylindrical. The slide and the hole can, however, have other forms, such as rectangular. Preferably, the diameter of the slide is only slightly smaller than the diameter of the hole, whereby the wall of the hole can efficiently support the slide while it is moved between the two positions. The diameter of the hole can be, for example, less than 10 mm, 10-50 mm, 50-200 mm or 200-500 mm. The diameter of the slide can be, for example, less than 2 mm, less than 1 mm, less than 0.5 mm, less than 0.1 mm or 0.005-0.5 mm smaller than the diameter of the hole.

According to an embodiment of the invention the thickness of the slide is larger than the depth of the hole. An advantage of this is that the slide settles quickly and firmly into the first position. The thickness of the slide can be, for example, less than 3 mm, 3-5 mm, 5-10 mm, 10-100 mm or 100-500 mm.

Depending on the application, the first cavity of the body may have various forms. Preferably, the first cavity is cylindrical and its diameter is at least equal to the diameter of the hole. The bottom of the first cavity is defined at least partly or totally by the second section, whereas the wall of the first cavity may be defined partly or totally by the first section, or by some other section of the body. If the wall of the first cavity is partly or totally defined by the first section, the diameter of the first cavity is larger than the diameter of the hole. Preferably, the depth of the first cavity is smaller than the thickness of the slide, whereby the slide may extend, at its second position, from the bottom of the first cavity into the hole.

An advantage of the magnet according to the invention is that the magnet does not consume electrical energy when the slide is at its first or second position. Also, the magnet does not have any complex structure for keeping the slide at its first or second position. In fact, the slide stays in place at both of its two positions with the help of the magnetic field produced by the permanent magnet. Another advantage of the magnet is that its magnetic state can be changed easily. Still another advantage of the magnet is its simple structure that makes the magnet very robust and reliable. Still another advantage of the magnet is that the demagnetization of the permanent magnet is almost prevented, because the magnetic circuit is closed at the first position of the slide, and also at the second position of the slide, when an object is attached to the magnet. Still another advantage of the magnet is that its holding force is minimal when the magnet is OFF, i.e. when the slide is at the first position.

According to an embodiment of the invention the first and the second section are attached together with a fourth section of the body, the fourth section being made of non-magnetic material. The first and the second section are separated by the fourth section. The first and the second section are not in direct contact with each other, whereby the flow of magnetic flux directly between the first and the second section is mainly prevented. In order to achieve the flow of magnetic flux between the first and the second section, the slide must be at its second position and the magnetic circuit must be closed by an object that is in contact with both the first and the second section. The magnet comprises an attachment surface, which is meant to be arranged in contact with the object to be attached. The attachment surface of the magnet is preferably flat, but it may have other forms depending on the application. Non-magnetic material of the fourth section can be paramagnetic material, such as resin, brass or aluminium, or diamagnetic material, such as acid-proof steel or stainless steel.

The magnet is suitable for moving objects and can thus be used as a lifting magnet. The magnet can be used as follows to move an object from one location to another. First, the attachment surface is arranged in contact with an object in such a manner that the first and the second section are in contact with the object. Next, the slide is moved to the second position as a result of which the magnet is attached to the object. And then, the object is moved with the magnet to a desired location and the magnet is detached from the object by moving the slide to the first position.

According to an embodiment of the invention the fourth section defines the wall of the first cavity. In this case the body of the magnet can be manufactured as follows. First, a circular groove is machined into a second end of a circular block of magnetic material, the circular groove extending from the second end towards the first end. Next, the circular groove is filled with non-magnetic liquid material, which is hardened into solid form. And finally, a bore, which is concentric with the circular groove, is drilled into the block from its first end towards the second end. The diameter of the bore is at least the inner diameter, but less than the outer diameter of the circular groove. The sum of the depth of the bore and the depth of the circular groove is larger than the thickness of the circular block. The inner part of the machined block corresponds to the second section, the outer part corresponds to the first section, and the intermediate part corresponds to the third section.

According to an embodiment of the invention the first and the second section are connected with a connecting member that is made of magnetic material. The connecting member can be a separate part that has been connected to the first and the second section. Alternatively, the connecting member can be an integral part or section of the body. The integral part or section can be, for example, a support that is formed when the first and the second section are machined. Preferably, the connecting member is applied together with the fourth section of the body. Because the connecting member is connected between the first and the second section, part of the magnetic flux flows through the connecting member, when the slide is at the second position. Therefore, the connecting member enables the slide to stay at the second position, when the magnet is not attached to an object. It also ensures that the slide stays at the second position, when the magnet is attached to an object that is very thin. Magnetic material of the connecting member is ferromagnetic material, such as iron, nickel, cobalt or their alloys.

According to an embodiment of the invention the first and the second section form an integral part. This means that the first and the second section are in direct contact with each other, whereby magnetic flux may flow directly from one section to the other, without an object to be attached. In this case the magnet is intended to be used as a solenoid actuator, and the body of the magnet can be manufactured, for example, as follows. First, a bore is drilled into a circular block of magnetic material from its first end towards the second end, and then, the diameter of the bore is increased at its lower portion by machining. The upper portion of the bore corresponds to the hole, whereas the lower portion corresponds to the first cavity.

According to an embodiment of the invention the magnet comprises a coil attached to the body, the coil being arranged to generate a magnetic force for moving the slide towards the first or the second position depending on the direction of electric current that is supplied to the coil. The coil, i.e. the electromagnetic coil, may be attached to the first or the second section, or it is preferably arranged inside the fourth section in such a manner that the coil encircles the slide at least partly, when the slide is at the second position. The coil may also be used to change the holding force of the magnet. When the slide is at its second position, the holding force of the magnet can be increased or decreased by supplying electric current to the coil in a suitable direction.

According to an embodiment of the invention the magnet comprises means for supplying electric current to the coil. The means for supplying electric current may comprise, for example, a battery that is connected to the coil via a control unit. The control unit is configured to control the amount and the direction of electric current supplied to the coil. The control unit may comprise one or more operating switches for using the magnet, and/or a wireless receiver for receiving control commands from a remote controller. The control unit may also comprise one or more indicator lights for indicating the status of the magnet, and/or a wireless transmitter for transmitting the status information to the remote controller.

The state of the magnet, i.e. the position of the slide, can be changed with an electric current pulse that has a certain duration, magnitude and polarity. The duration and the magnitude of the electric current pulse that is needed to change the state of the magnet are highly dependent on the structure and the size of the magnet, and the magnetic properties of the object to be attached. The polarity of the electric current pulse depends on the direction to which the slide needs to be moved. Typically, the duration of an electric current pulse is 30-300 ms.

According to an embodiment of the invention the body comprises a third section attached to the first section so that a second cavity is formed in the body, the second cavity being interconnected to the first cavity through the hole. The third section functions as a cover that protects the slide. Preferably, the third section is made of non-magnetic material so that the slide cannot attach to it. Non-magnetic material of the third section can be paramagnetic material, such as aluminium or plastic, or diamagnetic material, such as acid-proof steel.

According to an embodiment of the invention the first section defines a second cavity of the body, the second cavity being interconnected to the first cavity through the hole.

According to an embodiment of the invention the first and the second cavity contain a medium, and the magnet comprises a first conduit for conveying the medium between the first and the second cavity, a first end of the first conduit being arranged in communication with the first cavity and a second end of the first conduit being arranged in communication with the second cavity. The first conduit can be integrated into the body or be a gap between the slide and the hole. Preferably, the first end of the first conduit is arranged in the bottom of the first cavity, and the second end of the first conduit is arranged in the bottom of the second cavity. The purpose of the first conduit is to allow the medium to flow between the first and the second cavity, when the slide is moved from one position to the other. An advantage of the first conduit is that it steadies the motion of the slide. The magnet may comprise one or more first conduits. The number of the first conduits can be, for example, 1, 2-4, 5-10 or 10-30. The diameter of the first conduit at its first and second end can be, for example, 0.1-3 mm, 3-10 mm or 10-50 mm.

According to an embodiment of the invention the first and the second cavity contain a medium, and the body comprises a first conduit for conveying the medium into and out of the first cavity and a second conduit for conveying the medium into and out of the second cavity, a first end of the first conduit being arranged in communication with the first cavity and a first end of the second conduit being arranged in communication with the second cavity. Medium can be transferred into and out of the first and the second cavity through the first and the second conduit, respectively. Preferably, the first end of the first conduit is arranged to the bottom of the first cavity, and the first end of the second conduit is arranged to the bottom of the second cavity. A second end of the first conduit and a second end of the second conduit open outside the magnet. The first and the second conduit thus extend through the body. The second ends of the conduits may be in communication with each other so that the medium that has been transferred out of one cavity can be transferred into the other cavity. The magnet may comprise one or more first and second conduits. The number of the first and the second conduits can be, for example, 1, 2-4, 5-10 or 10-30. The diameter of the first and the second conduit can be, for example, 0.1-3 mm, 3-10 mm or 10-50 mm.

According to an embodiment of the invention the magnet comprises a pump coupled to a second end of the first and the second conduit. By using the pump, medium can be transferred from one cavity to the other so that the slide can be moved from one position to the other. When medium is pumped from the second cavity into the first cavity, the slide is moved towards the first position. And when medium is pumped from the first cavity into the second cavity, the slide is moved towards the second position. Depending on the type of the medium, the pump can be a hydraulic pump or a pneumatic pump, such as a piston pump, a screw pump or a gear pump. It is also possible to use an existing hydraulic or pneumatic system coupled to the second ends of the conduits for transferring the medium from one cavity to the other.

According to an embodiment of the invention the medium is gas or liquid. A suitable gas for the magnet is, for example, air. Suitable liquids for the magnet are, for example, oil and water. Preferably, the liquid that is used also functions as a lubricant, reducing the friction between the slide and the hole.

According to an embodiment of the invention the magnet comprises a sealing ring attached around the slide or attached to the wall of the hole. The sealing ring divides the airtight space formed by the first and the second cavity into two portions and prevents the medium from flowing between said portions. The sealing ring makes it easier to create a sufficient pressure difference and enables moving the slide efficiently. The sealing ring can be made of, for example, silicone, ethylenepropylene, polyurethane, nitrile-butadiene rubber or acetal plastics, or their compounds.

According to an embodiment of the invention the sealing ring is attached to a groove in the first pole piece. The sealing ring is attached to the first pole piece in such a position that the sealing ring stays inside the hole at all positions of the slide.

According to an embodiment of the invention the slide comprises a cap attached on top of the first pole piece for holding the sealing ring in place. The cap may comprise a groove in which the sealing ring is installed. The groove is preferably located close to the first pole piece. The groove may also be arranged to the cap and/or the first pole piece so that the sealing ring is hold in place between the cap and the first pole piece. The cap can be made of magnetic or non-magnetic material.

According to an embodiment of the invention the slide comprises a guiding rod extending from the second pole piece to a bore in the bottom of the first cavity. The guiding rod, which extends in the longitudinal direction of the hole, may be arranged to extend partly or completely through the slide. The bore is arranged in the second section. The guiding rod is preferably dimensioned in such a manner that at least part of the guiding rod stays in the bore all the time. The purpose of the guiding rod is to reduce the movement of the slide in other directions than in the longitudinal direction of the hole. The guiding rod is made of non-magnetic material, which can be paramagnetic material, such as resin, brass or aluminium, or diamagnetic material, such as acid-proof steel or stainless steel.

According to an embodiment of the invention the magnet comprises a magnetic flux sensor configured to measure magnetic flux density in the first section and means for determining the position of the slide based on the measured magnetic flux density. By a magnetic flux sensor it is meant a transducer that varies its output voltage and/or current in response to magnetic flux density. Since the path of the magnetic flux in the first section is dependent on the position of the slide, the position of the slide can be determined from the output voltage and/or current of the magnetic flux sensor. The means for determining the position of the slide may comprise, for example, a comparator circuit for providing, as a response to the output voltage and/or current of the magnetic flux sensor, an output signal identifying whether the slide is at its first or second position. The magnetic flux sensor may also be configured to indicate the position of the slide directly as a binary output. The magnetic flux sensor may also be used to detect whether an object is attached to the magnet or not.

The magnetic flux sensor can be arranged inside the first section or attached on its surface. Preferably, the magnetic flux sensor is arranged inside the portion of the first section that surrounds the hole.

The magnet may comprise a plurality of magnetic flux sensors, which are configured to measure magnetic flux densities in different spatial locations and/or directions. The magnetic flux sensors can be configured to measure magnetic flux densities in orthogonal and/or opposite directions. The number of magnetic flux sensors can be, for example, 2, 3, or more than 3.

According to an embodiment of the invention the magnetic flux sensor is one of the following: a Hall sensor, an AMR magnetometer, a MEMS sensor or a reed relay.

The exemplary embodiments of the invention presented in this text are not interpreted to pose limitations to the applicability of the appended claims. The verb "to comprise"

is used in this text as an open limitation that does not exclude the existence of also unrecited features. The features recited in the dependent claims are mutually freely combinable unless otherwise explicitly stated.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the description of specific embodiments when read in connection with the accompanying drawings.

DETAILED DESCRIPTION OF THE DRAWINGS

The same reference signs are used of the same or like components in different embodiments.

Figure 1:
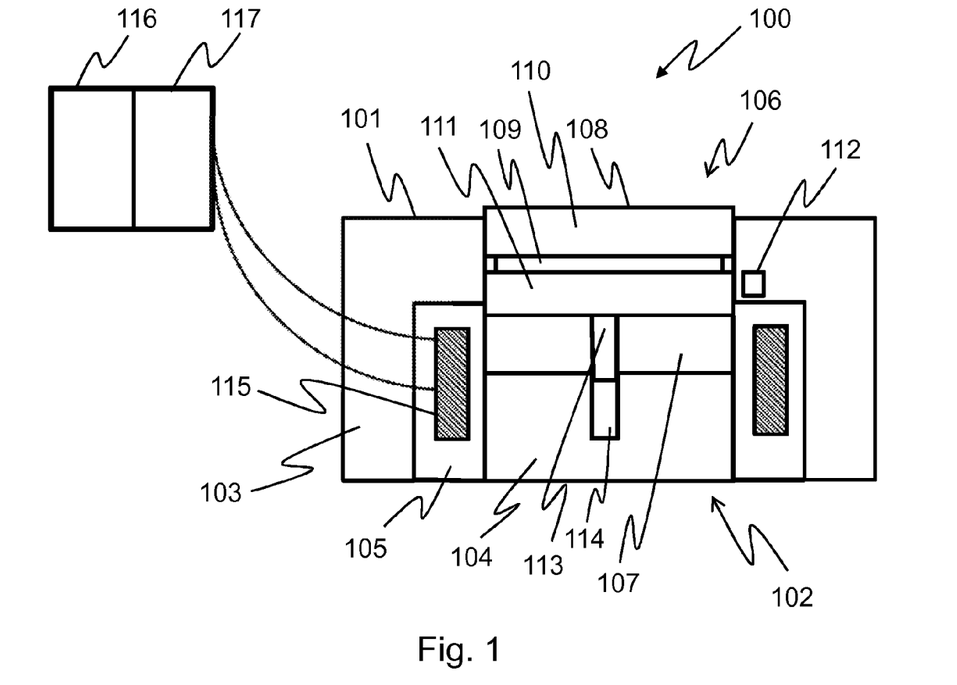
FIG. 1 illustrates a cross-sectional view of a magnet according to a first embodiment of the invention.

FIG. 1 illustrates a cross-sectional view of a magnet according to a first embodiment of the invention. The magnet 100 comprises a cylindrical body 101 that comprises at its one end an attachment surface 102, which is meant to be arranged in contact with an object to be attached.

The body 101 of the magnet 100 comprises a first and a second section 103, 104 made of magnetic material. The first and the second section 103, 104 are attached together with a fourth section 105 of the body 101, which fourth section 105 is made of non-magnetic material. The fourth section 105 has the form of a sleeve and is attached around the second section 104 that is cylindrical. The first section 103 is attached around the fourth section 105.

The first section 103 comprises a hole 106 that opens into a first cavity 107 of the body 101, which first cavity 107 is cylindrical. The bottom of the first cavity 107 is defined by the second section 104, and the wall of the first cavity 107 is defined by the fourth section 105.

The magnet 100 comprises a slide 108 that is movably arranged in the hole 106 of the first section 103. The slide 108 is cylindrical and comprises a permanent magnet 109 and a first and a second pole piece 110, 111 that are attached to opposite magnetic pole surfaces of the permanent magnet 109. The second pole piece 111 is directed towards the bottom of the first cavity 107.

The slide 108 is arranged to be movable relative to the body 101 between a first and a second position. In FIG. 1, the slide 108 is at the first position. At the first position of the slide 108, magnetic flux generated by the permanent magnet 109 is short-circuited by the first section 103, and at the second position of the slide 108, magnetic flux generated by the permanent magnet 109 can be directed to an object to be attached through the first and the second section 103, 104. The position of the slide 108 is determined with a magnetic flux sensor 112 that is arranged inside the first section 103, close to the hole 106.

The slide 108 comprises a guiding rod 113 that extends from the second pole piece 111 to a bore 114 in the bottom of the first cavity 107. The guiding rod 113 and the bore 114 are dimensioned in such a manner that at least part of the guiding rod 113 stays in the bore 114 all the time.

The magnet 100 comprises a coil 115 that is arranged to generate a magnetic force for moving the slide 108 towards the first or the second position depending on the direction of electric current that is supplied to the coil 115. The coil 115 is arranged inside the fourth section 105 and at least partly around the slide 108. The magnet 100 comprises a battery 116 that is connected via a control unit 117 to the coil 115. The control unit 117 controls the amount and the direction of electric current supplied from the battery 116 to the coil 115. The state of the magnet 100, i.e. the position of the slide 108, can be changed with an electric current pulse that has a certain duration, magnitude and polarity.

Figure 2:
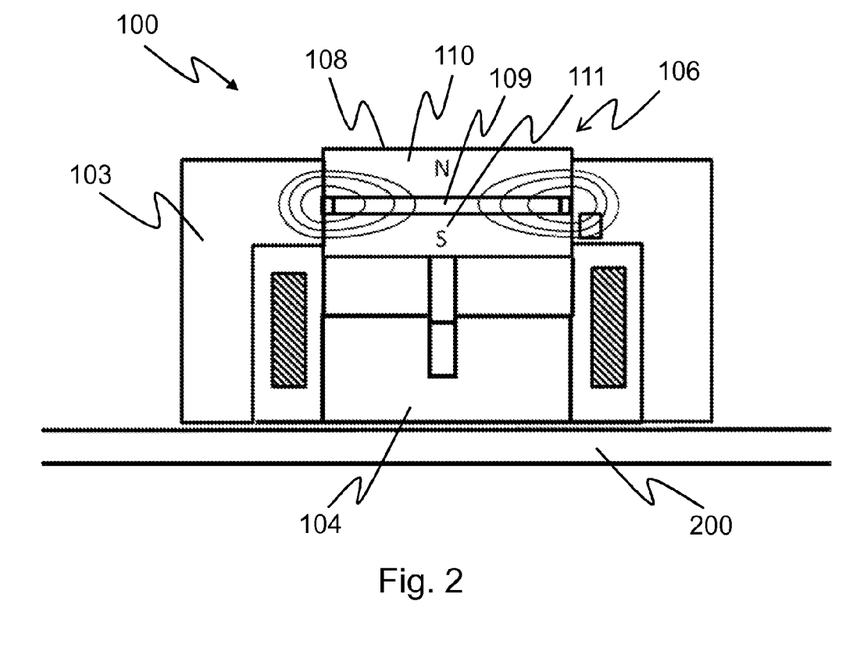
FIG. 2 illustrates the magnetic field generated by the magnet of FIG. 1, when the slide is at the first position.

FIG. 2 illustrates the magnetic field generated by the magnet of FIG. 1, when the slide is at the first position. The magnetic field is represented by magnetic field lines. At the first position of the slide 108, the permanent magnet 109 and part of the first and the second pole piece 110, 111 are located inside the hole 106. At this position, as can be seen in FIG. 2, essentially all of the magnetic field lines pass from the first pole piece 110 to the second pole piece 111 through a portion of the first section 103 that surrounds the hole 106. The magnet 100 cannot thus attach to an object 200.

Figure 3:
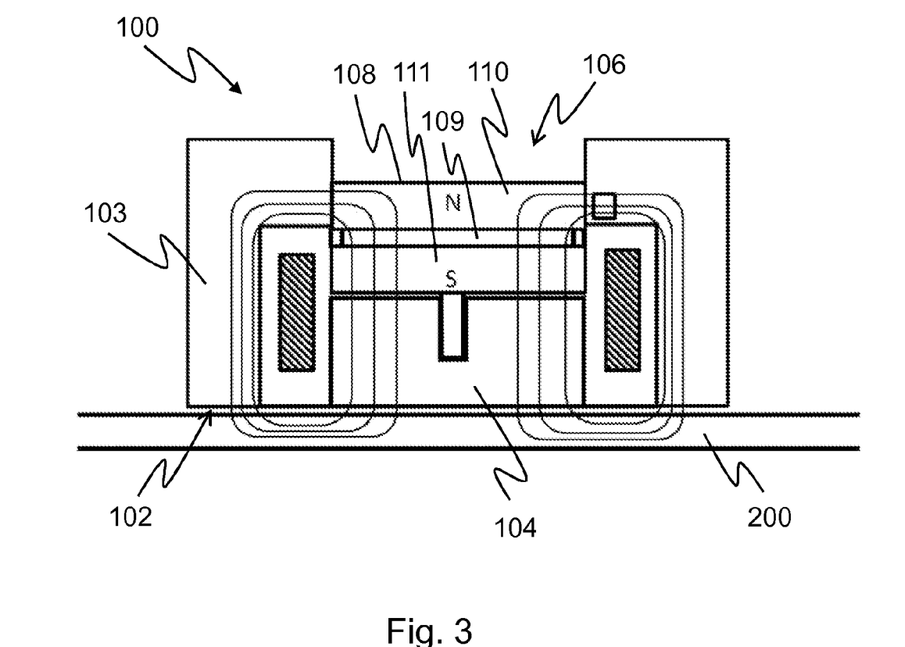
FIG. 3 illustrates the magnetic field generated by the magnet of FIG. 1, when the slide is at the second position.

FIG. 3 illustrates the magnetic field generated by the magnet of FIG. 1, when the slide is at the second position. The magnetic field is represented by magnetic field lines. At the second position of the slide 108, the permanent magnet 109 and the second pole piece 111 are located outside the hole 106, and part of the first pole piece 110 is located inside the hole 106. At this position, as can be seen in FIG. 3, essentially all of the magnetic field lines pass from the first pole piece 110 to the second pole piece 111 through the first and the second section 103, 104, and through the object 200 that is in contact with the first and the second section 103, 104 at the attachment surface 102. The object 200 is thus attached to the magnet 100.

Figure 4:
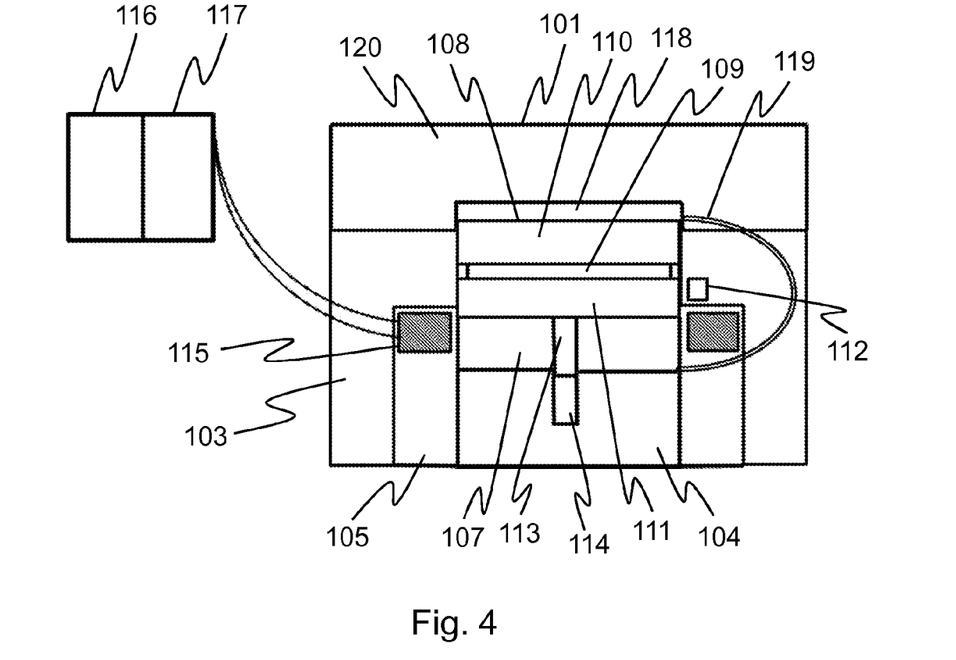
FIG. 4 illustrates a cross-sectional view of a magnet according to a second embodiment of the invention.

FIG. 4 illustrates a cross-sectional view of a magnet according to a second embodiment of the invention. The magnet of FIG. 4 differs from the magnet of FIG. 1, in that it comprises a second cavity 118 and a third conduit 119 for transferring liquid between the first and the second cavity 107, 118.

The second cavity 118, which is cylindrical, is defined by a third section 120 that is attached to the first section 103. The third section 120 is made of non-magnetic material.

The first conduit 119 is integrated to the body 101. A first end of the third conduit 119 is arranged in communication with the first cavity 107 and a second end of the third conduit 119 is arranged in communication with the second cavity 118. The third conduit 119 allows the liquid to flow between the first and the second cavity 107, 118, when the slide 108 is moved from one position to the other.

Figure 5:
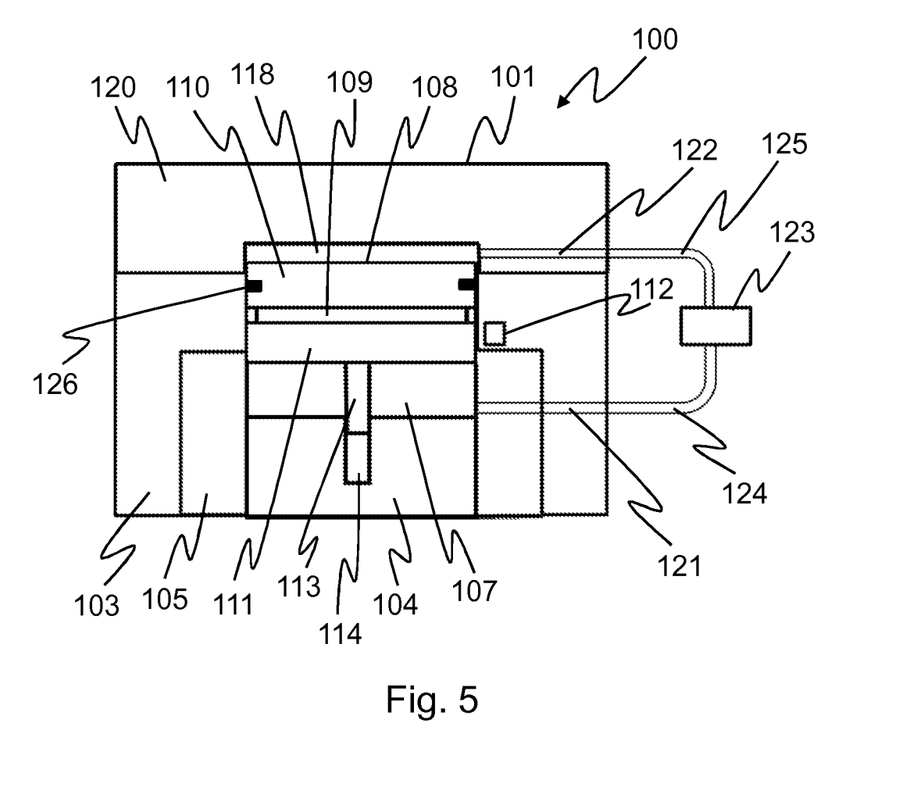
FIG. 5 illustrates a cross-sectional view of a magnet according to a third embodiment of the invention.

FIG. 5 illustrates a cross-sectional view of a magnet according to a third embodiment of the invention. The magnet of FIG. 5 differs from the magnet of FIG. 1, in that it comprises a second cavity 118, and the means for moving the slide 108 between the first and the second position are different. The magnet of FIG. 5 also comprises a sealing ring 126 that is attached around the first pole piece 110.

The second cavity 118, which is cylindrical, is defined by a third section 120 that is attached to the first section 103. The third section 120 is made of non-magnetic material.

In the magnet of FIG. 5, the position of the slide 108 is changed by transferring liquid from one cavity to the other. The magnet 100 comprises a first and a second conduit 121, 122 that are integrated into the body 101. A first end of the first conduit 121 is arranged in communication with the first cavity 107, and a first end of the second conduit 122 is arranged in communication with the second cavity 118. The second and the second conduit 121, 122 extend through the body 101 so that second ends of the conduits 121, 122 open outside the magnet 100. The second end of the first conduit 121 and the second end of the second conduit 122 are connected to a pump 123 with a first and a second pipe 124, 125. By using the pump 123, medium may be transferred from one cavity to the other so that the slide 108 is moved from one position to the other.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A magnet, comprising:
    a body having a first, a second, and a third section, and
    a slide arranged to be movable relative to the body between a first and a second position, the slide comprising a permanent magnet, and a first and a second pole piece attached to opposite magnetic pole surfaces of the permanent magnet;
wherein the first section comprises a hole that opens into a first cavity of the body, bottom of the first cavity being delimited at least partly by the second section, in which hole the slide is movably arranged so that the second pole piece is directed towards the bottom of the first cavity, wherein at the first position of the slide, magnetic flux generated by the permanent magnet is short-circuited by the first section, and at the second position of the slide, magnetic flux generated by the permanent magnet is directed through the first and the second section, and
wherein the third section is attached to the first section so that a second cavity is formed in the body, the second cavity being interconnected to the first cavity through the hole, and wherein the first and the second cavity contain a medium, and the body comprises a first conduit for conveying the medium into and out of the first cavity and a second conduit for conveying the medium into and out of the second cavity, a first end of the first conduit being arranged in communication with the first cavity and a first end of the second conduit being arranged in communication with the second cavity.

2. The magnet according to claim 1, wherein thickness of the permanent magnet is smaller than thickness of the first pole piece and thickness of the second pole piece.

3. The magnet according to claim 1, wherein thickness of the slide is larger than depth of the hole.

4. The magnet according to claim 1, wherein the first and the second section are attached together with a fourth section of the body, the fourth section being made of non-magnetic material.

5. The magnet according to claim 4, wherein the fourth section defines a wall of the first cavity.

6. The magnet according to claim 1, wherein the first and the second section form an integral part.

7. The magnet according to claim 1, wherein the magnet comprises a coil attached to the body, the coil being arranged to generate a magnetic force for moving the slide towards the first or the second position depending on the direction of electric current that is supplied to the coil.

8. The magnet according to claim 7, wherein the magnet comprises means for supplying electric current to the coil.

9. The magnet according to claim 1, wherein the first and the second cavity contain a medium, and the magnet comprises a third conduit for conveying the medium between the first and the second cavity, a first end of the third conduit being arranged in communication with the first cavity and a second end of the third conduit being arranged in communication with the second cavity.

10. The magnet according to claim 1, wherein the magnet comprises a pump coupled to a second end of the first and the second conduit.

11. The magnet according to claim 1, wherein the medium is gas or liquid.

12. The magnet according to claim 1, wherein the magnet comprises a sealing ring attached around the slide or attached to the wall of the hole.

13. The magnet according to claim 12, wherein the sealing ring is attached to a groove in the first pole piece.

14. The magnet according to claim 1, wherein the slide comprises a guiding rod extending from the second pole piece to a bore in the bottom of the first cavity.

15. The magnet according to claim 1, wherein the magnet comprises:
    a magnetic flux sensor configured to measure magnetic flux density in the first section, and
    means for determining the position of the slide based on the measured magnetic flux density.

16. The magnet according to claim 15, wherein the magnetic flux sensor is one of the following: a Hall sensor, an AMR magnetometer, a MEMS sensor or a reed relay.

* * * * *